United States Patent Office 3,626,546
Patented Dec. 14, 1971

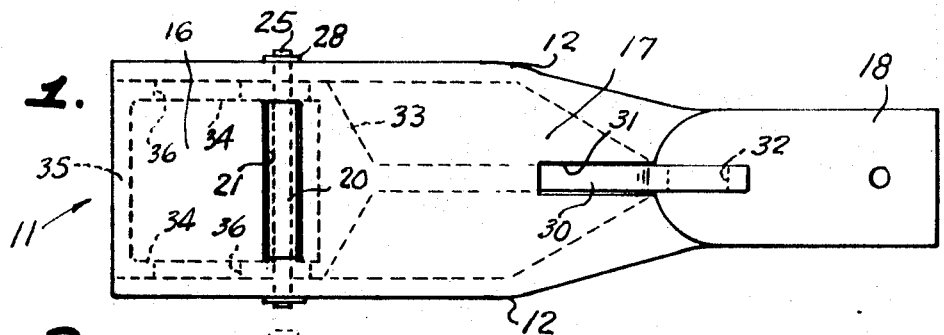
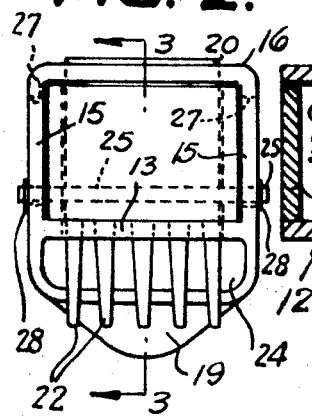
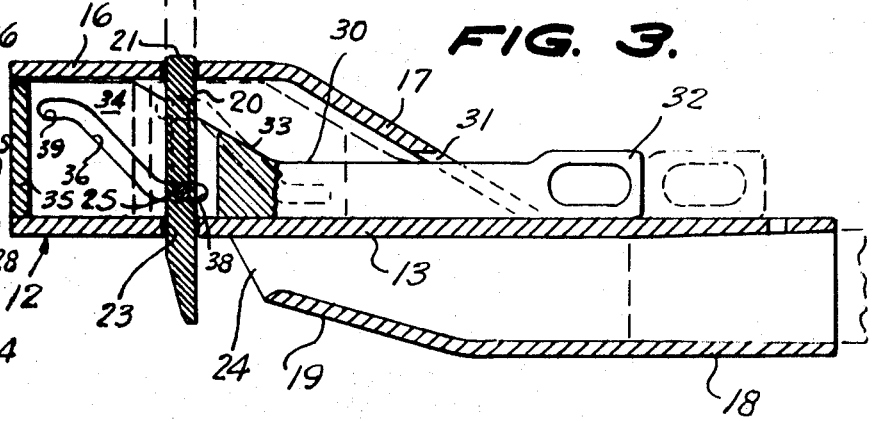
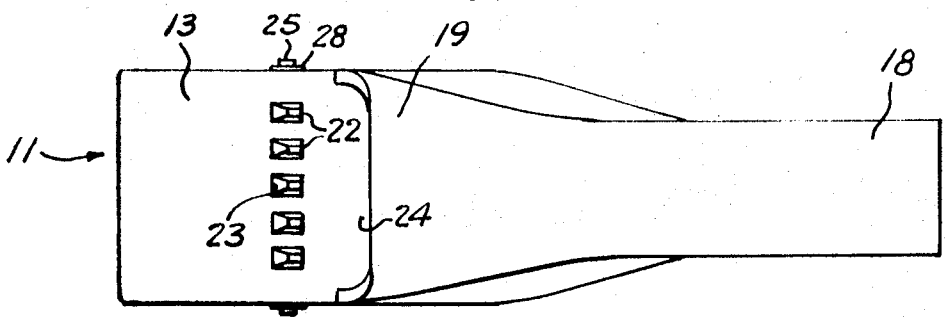
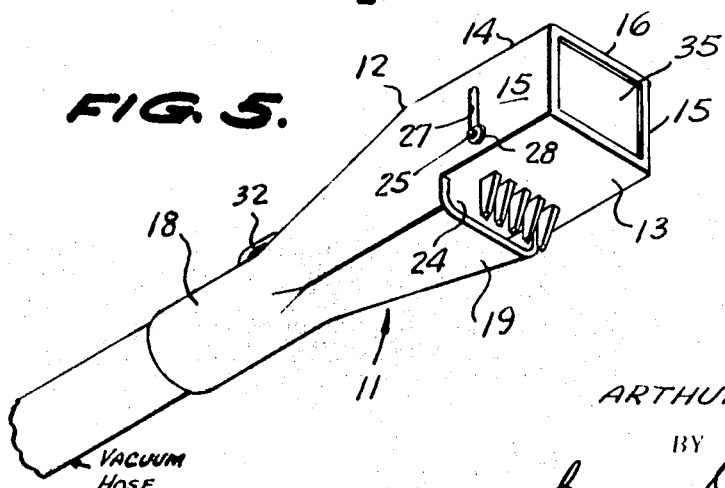

3,626,546
ATTACHMENT FOR A VACUUM CLEANER TO COMB THE HAIR OF PETS
Arthur L. Dove, 464 Watchung Ave., Watchung, N.J. 07060
Filed Feb. 13, 1970, Ser. No. 11,139
Int. Cl. A01k 13/00
U.S. Cl. 15—402
9 Claims

ABSTRACT OF THE DISCLOSURE

A combined comb and vacuum handpiece for combing the hair of animals. The comb portion has a set of teeth located adjacent the intake orifice of the vacuum handpiece portion and has a cam mechanism for raising the comb teeth to loosen hair therefrom and to allow the loosened hair to be drawn into the vacuum intake orifice.

This invention relates to animal combing devices, and more particularly to a combing device in which vacuum is utilized to remove loosened hairs.

A main object of the invention is to provide a novel and improved combing device for household pets and other domesticated animals, the device being relatively simple in construction, being adapted to be connected to a standard vacuum cleaner, and being highly effective in removing loosened hair.

A further object of the invention is to provide an improved animal combing device in the form of a vacuum handpiece adapted to be attached to a conventional vacuum cleaner, the device being arranged to remove loosened hair accumulating thereon during the combing process, the device involving relatively few parts, being easy to manipulate, and permitting an animal to be combed without littering the adjacent area with loosened animal hair.

A still further object of the invention is to provide an improved combined comb and vacuum handpiece for use in combing the hair of household pets and other domesticated animals, the device being compact in size, being easy to handle, being inexpensive to fabricate, being rugged in construction, and enabling an animal to be combed in a sanitary and efficient manner.

Further objects and advantages of the invention will become apparent from the following description and claims, and from the accompanying drawings, wherein:

FIG. 1 is a top plan view of an improved animal combing device constructed in accordance with the present invention.

FIG. 2 is a front end elevational view of the combing device of FIG. 1.

FIG. 3 is a longitudinal vertical cross-sectional view taken substantially on the line 3—3 of FIG. 2.

FIG. 4 is a bottom plan view of the animal combing device of FIGS. 1, 2 and 3.

FIG. 5 is a perspective view of the animal combing device of FIGS. 1 to 4, shown attached to the vacuum hose associated with a conventional vacuum cleaner.

Referring to the drawings, 11 generally designates an improved animal combing device constructed in accordance with the present invention. The device is constructed so as to be employed as a handpiece associated with a conventional vacuum cleaner. Thus, the device 11 comprises an elongated main body 12 comprising a horizontally extending elongated partition wall 13 forming the bottom wall of a generally rectangular housing portion 14 which is integrally molded with the forward portion of the partition wall 13, and which comprises the longitudinal side walls 15, 15 and the top wall 16. The top wall 16 merges with a downwardly and rearwardly sloping wall portion 17 which integrally merges with a rear tubular duct portion 18. The duct portion 18 integrally communicates with a forwardly flaring nozzle portion 19. As shown in FIG. 5, the nozzle portion 19 flares forwardly in width, but, as shown in FIG. 3, the bottom wall of said nozzle portion is inclined upwardly and forwardly. The side walls 15, the top wall 16, the nozzle 19, the elongated main intermediate wall 13 and the duct portion 18 are preferably integrally formed from a single piece of material, such as molded plastic material, or the like.

The top wall 16 is formed with a transverse slot 21, and slidably engaged in said slot is a transversely extending comb member 20 which is formed with a plurality of depending comb teeth 22 which extend slidably through apertures 23 vertically aligned with slot 21, said apertures being formed in the forward portion of the longitudinally extending main intermediate wall member 13. Thus, the comb member 20 is movable vertically from its normal position, shown in full line view in FIG. 3 wherein the spaced comb teeth 22 project downwardly from wall 13, to a retracted position wherein the comb teeth are retracted upwardly relative to wall 13, said retracted position being shown in dotted view in FIG. 3. As is further shown in FIG. 3, the intake orifice 24 of the nozzle 19 is located rearwardly adjacent to the transverse plane of the comb member 20, namely, is located sufficiently close to the plane of the comb teeth 22 so as to effectively draw in loosened material collected by the comb teeth in a manner presently to be described.

Designated at 25 is a transverse pin member which extends through the intermediate portion of the comb 20 and whose opposite ends extend slidably through vertical slots 27, 27 formed in the side walls 15, 15. The transverse pin member 25 is suitably retained in the position thereof illustrated in FIGS. 1, 2, 4 and 5 by conventional locking rings 28, 28 engaged in grooves provided therefor at the opposite end portions of the pin 25. Thus, the slots 27, 27 cooperate with the pin 25 to guide the comb 20 vertically.

Designated at 30 is a longitudinally extending cam bar which is slidably supported on the main intermediate wall 13 and which extends through an intermediate slot 31 provided in the sloping wall portion 17. The exposed end of the cam bar 30 is provided with an integrally formed handle portion 32. The forward portion of the cam bar 30 is formed with a yoke 33 having the opposite vertical side walls 34, 34 integrally connected at their forward ends by the transverse extending end wall element 35. The longitudinal side elements 34, 34 are provided with inclined, generally S-shaped slots 36, 36 through which the transverse pin 25 extends, the slots 36, 36 being cammingly cooperable with the pin 25 to reciprocate the comb 20 responsive to manual reciprocation of the bar 30. Thus, when the bar 30 is moved rearwardly from the full line position thereof shown in FIG. 3 to the dotted view position thereof, the cam slots 36, 36 act on the pin 25 to retract the comb 20 upwardly from its full line position to its dotted view position, causing the comb teeth 22 to be retracted upwardly in their apertures 23.

Normally, namely, when the device is to be used for combing an animal, the pin 25 is engaged in the horizontally extending lower end portions 38 of the cam slots 36. When the handle 32 is retracted to the dotted view position thereof, shown in FIG. 3, as above described, the pin 25 traverses inclined slot portions and ultimately is engaged in the horizontal top end portions 39 of the cam slots 30.

In using the device, the handpiece 11 is employed to comb out an animal's hair, to loosen fine materials lodged in the animal's hair. During this process, loosened hair accumulates on the comb teeth 22. When it is desired to collect the loose material, the bar 30 is pulled rearwardly to the dotted view position thereof, shown in FIG. 3, whereupon the hair or other accumulated material carried by the comb teeth is disengaged from the teeth by the upward movement of the teeth in their apertures 23. The loosened material is drawn into the vacuum nozzle orifice 24 and is collected by the associated vacuum cleaner. The cam bar 30 may then be pushed forward to its working position, shown in full line view in FIG. 3, to continue the combing operation.

It will be noted that the yoke 33 slidably engages in the rectangular housing defined by side walls 15, 15, top wall 16 and main wall 13, and cooperates with the slot 31 to constrain the bar 30 for longitudinal movement in the body of the handpiece. This constraint produces efficient camming cooperation between the transverse pin member 25 and the inclined cam slots 36, 36. Similarly, the comb 20 is guided for vertical movement by the sliding engagement thereof in the slot 21 and the sliding engagement of the ends of the pin 25 in the vertical slots 27, 27.

While a specific embodiment of an improved animal comb device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An animal comb device comprising a handpiece including an elongated hollow body having a transverse slot, a comb member slidably mounted in said slot and having a plurality of spaced comb teeth normally projecting from one side of the body, means to at times move said comb member in said slot to retract the teeth into the body, and a vacuum duct on said body having an intake orifice adjacent the plane of said comb teeth at said one side of the body, wherein said hollow body has a top wall and an opposite bottom wall, said transverse slot being formed in said top wall, said bottom wall having apertures slidably receiving said comb teeth and providing a wiping action on said comb teeth when the teeth are retracted into the hollow body.

2. The animal comb device of claim 1, and wherein the means to move the comb member comprises a cam movably mounted on the body and follower means on the comb member engaging said cam.

3. The animal comb device of claim 2, and wherein said cam comprises an arm, and means constraining said arm for longitudinal movement on said body.

4. The animal comb device of claim 3, and wherein said arm is formed with inclined slot means and said follower means comprises pin means on the comb member engaged in said inclined slot means.

5. The animal comb device of claim 4, and wherein said arm includes an external operating handle portion at one end of the arm.

6. The animal comb device of claim 5, and wherein said pin means comprises a transverse pin member extending through said comb member and through the inclined slot means of said arm.

7. The animal comb device of claim 6, and wherein the sides of the body are formed with slots extending coplanar with said comb member, said transverse pin means extending slidably through said last-named slots.

8. The animal comb device of claim 7, and wherein said body is hollow and said arm has a yoke slidable longitudinally in said body, said yoke having opposite longitudinal walls, said slot means comprising transversely aligned inclined slots formed in said opposite longitudinal walls.

9. The animal comb device of claim 1, and wherein said vacuum duct has a bottom wall adjacent said intake orifice sloping upwardly toward the comb teeth.

References Cited

UNITED STATES PATENTS

| | | | |
|---|---|---|---|
| 2,181,455 | 11/1939 | Gussack | 15—48 |
| 2,613,388 | 10/1952 | Walker | 15—373 |
| 2,675,575 | 4/1954 | Dow | 15—373 |
| 2,948,014 | 8/1960 | Allen | 15—373 X |
| 3,145,691 | 8/1964 | Yates | 119—85 X |
| 3,308,500 | 3/1967 | Woodruff | 119—85 X |

ROBERT W. JENKINS, Primary Examiner

C. K. MOORE, Assistant Examiner